Patented Sept. 26, 1939

2,174,495

UNITED STATES PATENT OFFICE 2,174,495

SYNTHETIC RESIN COATING COMPOSITION

Charles Bogin, Terre Haute, Ind., assignor to Commercial Solvents Corporation, Terre Haute, Ind., a corporation of Maryland No Drawing. Application January 28, 1938, Serial No. 187,404

7 Claims. (Cl. 260—32)

My invention pertains to coating compositions, and more particularly to coating compositions containing polymerized vinyl compounds.

Various types and grades of synthetic resins have been produced by the polymerization of vinyl compounds. Among these resins, certain types are particularly adapted for use in coating compositions, for example, resins resulting from the conjoint polymerization of a vinyl halide with a vinyl ester of a lower aliphatic acid. These resins, in general, possess very interesting properties, particularly those resulting from the polymerization of mixtures of vinyl chloride and vinyl acetate with a high proportion of the chloride. Such resins have great physical and chemical stability and are not readily affected by concentrated hydrochloric or hydrofluoric acids, 50% sodium hydroxide solution, alcohols, or even by a mixture of potassium dichromate and sulfuric acid. On account of this superior stability, synthetic resins of this type have been suggested for numerous uses in the finishing field.

These resins, however, possess certain general defects which make their use for coating purposes in particular somewhat difficult. For example, contact at elevated temperatures with certain metals such as zinc, iron or tin, causes rapid decomposition of polymerized vinyl compounds prepared from vinyl chloride, with the liberation of hydrochloric acid. The presence of pigments containing iron or zinc has the same effect. Another of the important handicaps up to the present time in the use of vinyl resins in coating compositions has been the lack of satisfactory solvents.

I have now discovered that alkyl ethers of diacetone alcohol are particularly good solvents for vinyl resins of the above type, and an object of my invention is the use of such solvents either alone or in conjunction with suitable diluents in the production of vinyl resin coating compositions.

A suitable form of vinyl resin for use in coating compositions is described in United States Patent No. 1,935,577, granted November 14, 1933, to E. W. Reid and is produced by conjointly polymerizing from about 90 parts to about 10 parts of vinyl chloride with from about 10 parts to about 90 parts of vinyl acetate.

The alkyl ethers of diacetone alcohol which I use as solvents for the vinyl resins in my improved coating compositions may be produced in various ways, as for example, that described in United States Patent No. 1,823,704, granted September 15, 1931, to C. W. Simms. Any of the alkyl ethers of diacetone alcohol of suitable boiling points and rates of evaporation may be used as solvents for the preferred form of vinyl resin disclosed above. Examples of such suitable materials are methyl, ethyl, propyl, normal butyl, isobutyl, and isoamyl ethers of diacetone alcohol.

In order to cheapen the compositions, and sometimes for other reasons, it is desirable not to use compositions consisting only of a single solvent or solvent mixture. On account of the high tolerances of alkyl diacetone ethers for the coal tar hydrocarbons such as, for example, toluol, large amounts thereof may be used as diluents for alkyl diacetone ether solutions of vinyl resins. The paraffin hydrocarbons may be employed as diluents only in much lower proportions than the aromatic hydrocarbons. Various hydrocarbon mixtures may, of course, also be used as diluents, and other materials ordinarily used in synthetic resin coating compositions may also be employed in my improved vinyl resin compositions. For example, plasticizers such as tricresyl phosphate, dibutyl phthalate, tributyl phosphate, or the like may be incorporated. Other resins, either natural or synthetic, may likewise be used in the compositions. Also, pigments or dyes may be added, provided care is taken to exclude zinc and iron compounds.

The viscosities of vinyl resin coating compositions, just as in the case of most other coating compositions, are of considerable importance regardless of the method of application employed. Inasmuch as the character of the solvent mixture employed affects not only the character of the deposited films obtainable, but also the viscosities of the liquid coating compositions, the choice of proper solvents to use with vinyl resins is highly important and depends to a large extent on the viscosity characteristics of the solutions obtained therewith. Most of the solvents previously suggested for use with vinyl resins are not suitable for the preparation of satisfactory coating compositions because solutions of the resin made with them not only possess high initial viscosities, but in addition tend to increase in viscosity on aging and ultimately set to solid gels. While the alkyl diacetone ether solutions likewise possess these characteristics to a certain degree, they increase in viscosity to a lesser extent than solutions employing common types of solvent compositions previously used. This added to the fact that the alkyl diacetone ethers have higher boiling points and correspondingly slower rates of evaporation make them much better suited for most types of vinyl coating compositions than previously available solvents.

While it is often times desired to use a diluent in vinyl resin coating compositions, it should be noted that the incorporation of such a diluent ordinarily results in an increase in the viscosity of the composition and, under certain conditions, the viscosity increase with poorer thinner mixtures becomes very great. This increase in viscosity, in general, depends upon such factors as temperature of the solution, the concentration of the resin in solution, the viscosity characteristics of the particular grade of resin employed, etc. It will be evident, therefore, that the proportion of diluent to alkyl diacetone ether employed in any particular coating composition will vary with the particular diluent, the character and concentration of the resin, the probable length of time before use of the compositions, and other such factors. By proper selection of the particular alkyl diacetone ether and the diluent and proportions thereof, both the viscosity and the rate of evaporation of the coating compositions can be widely varied so as to obtain products of desired properties. For example, the viscosity of a 25 gram (per 100 c. c. of volatiles) solution of vinyl resin at 40° C. in a 60% methyl diacetone ether—40% toluol solution was found to be 670 centipoises as compared to 1100 centipoises for a 30% methyl diacetone ether—70% toluol solution of similar concentration at the same temperature. Where the viscosity is found to be too high for a particular given solvent mixture, it can be very materially lowered by only a slight decrease in the concentration of the vinyl resin incorporated therein.

The following example will illustrate the use of alkyl diacetone ethers in unpigmented vinyl resin coating compositions:

Example I

| | | |
|---|---|---|
| Vinyl resin | grams per 100 c. c. | 14 |
| Dibutyl phthalate | do | 3 |
| Methyl diacetone ether | percent | 30 |
| Toluol | do | 70 |

The following is a formula for a similar composition containing pigments and another synthetic resin:

Example II

| | | |
|---|---|---|
| Vinyl resin | grams per 100 c. c. | 14 |
| Ester gum | do | 5 |
| Dibutyl phthalate | do | 4 |
| Titanium dioxide | do | 5 |
| Carbon black | do | 1 |
| Methyl diacetone ether | percent | 40 |
| Toluol | do | 60 |

The following example will illustrate the use of a higher boiling diacetone ether as the solvent:

Example III

| | | |
|---|---|---|
| Vinyl resin | grams per 100 c. c. | 13 |
| Ester gum | do | 4 |
| Dibutyl phthalate | do | 3 |
| Normal butyl diacetone ether | percent | 40 |
| Toluol | do | 60 |

If desired, other solvents such as acetone, methyl isobutyl ketone, ethyl acetate, butyl acetate, etc. or other diluents or diluent mixtures such as xylol, petroleum naphtha and hydrogenated petroleum diluents, and other resins such as damar and mastic may be incorporated in any of the above formulae. In adding such materials, however, care should ordinarily be observed not to incorporate substantial amounts of materials tending to increase the viscosity or accelerate the rate of gelling in the solution such as, for example, the alcohols which when present in only very small proportions will cause a marked increase in the viscosity and will increase the gelling tendency of the solution.

Now having described my invention, what I desire to claim is:

1. A coating composition possessing decreased gelling tendencies comprising a tough and strong artificial resin resulting from the conjoint polymerization of a vinyl halide with a vinyl ester of a lower aliphatic acid, said resin being dissolved in a sufficient quantity of a volatile solvent having a low rate of evaporation to decrease the gelling tendency of the resulting composition comprising an alkyl diacetone ether, to make a readily flowable composition adapted to produce resistant, adhesive and stable protective or ornamental surface coatings.

2. A coating composition possessing decreased gelling tendencies comprising a tough and strong artificial resin resulting from the conjoint polymerization of a vinyl halide with a vinyl ester of a lower aliphatic acid, said resin being dissolved in a sufficient quantity of a volatile solvent having a low rate of evaporation to decrease the gelling tendency of the resulting composition comprising an alkyl diacetone ether and a liquid hydrocarbon of the toluene series, to make a readily flowable composition adapted to produce resistant, adhesive and stable protective or ornamental surface coatings.

3. A coating composition possessing decreased gelling tendencies comprising a tough and strong artificial resin resulting from the conjoint polymerization of a vinyl chloride with vinyl acetate, said resin being dissolved in a sufficient quantity of a volatile solvent having a low rate of evaporation to decrease the gelling tendency of the resulting composition comprising an alkyl diacetone ether and a liquid hydrocarbon of the toluene series, to make a readily flowable composition adapted to produce resistant, adhesive and stable protective or ornamental surface coatings.

4. A coating composition possessing decreased gelling tendencies comprising a tough and strong artificial resin resulting from the conjoint polymerization of a vinyl halide with a vinyl ester of a lower aliphatic acid, said resin being dissolved in a sufficient quantity of a volatile solvent having a low rate of evaporation comprising methyl diacetone ether, to make a readily flowable composition adapted to produce resistant, adhesive and stable protective or ornamental surface coatings.

5. A coating composition possessing decreased gelling tendencies comprising a tough and strong artificial resin resulting from the conjoint polymerization of a vinyl halide with a vinyl ester of a lower aliphatic acid, said resin being dissolved in a sufficient quantity of a volatile solvent having a low rate of evaporation comprising butyl diacetone ether, to make a readily flowable composition adapted to produce resistant, adhesive and stable protective or ornamental surface coatings.

6. A coating composition possessing decreased gelling tendencies comprising a tough and strong artificial resin resulting from the conjoint polymerization of a vinyl halide with a vinyl ester of a lower aliphatic acid, said resin being dissolved in a sufficient quantity of a volatile solvent having a low rate of evaporation comprising methyl diacetone ether and a liquid hydrocarbon of the toluene series, to make a readily flowable composition adapted to produce resistant, adhesive and stable protective or ornamental surface coatings.

7. A coating composition possessing decreased gelling tendencies comprising a tough and strong artificial resin resulting from the conjoint polymerization of a vinyl halide with a vinyl ester of a lower aliphatic acid, said resin being dissolved in a sufficient quantity of a volatile solvent having a low rate of evaporation comprising butyl diacetone ether and a liquid hydrocarbon of the toluene series, to make a readily flowable composition adapted to produce resistant, adhesive and stable protective or ornamental surface coatings.

CHARLES BOGIN.